United States Patent
Sato et al.

(10) Patent No.: US 7,460,756 B2
(45) Date of Patent: Dec. 2, 2008

(54) PLASTIC OPTICAL FIBER AND METHOD FOR MANUFACTURING THE SAME

(75) Inventors: Takanori Sato, Shizuoka (JP); Hideyuki Karaki, Kanagawa (JP); Tadahiro Kegasawa, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 131 days.

(21) Appl. No.: 10/594,686

(22) PCT Filed: Mar. 29, 2005

(86) PCT No.: PCT/JP2005/006566

§ 371 (c)(1),
(2), (4) Date: Sep. 28, 2006

(87) PCT Pub. No.: WO2005/096042

PCT Pub. Date: Oct. 13, 2005

(65) Prior Publication Data

US 2007/0205526 A1   Sep. 6, 2007

(30) Foreign Application Priority Data

Mar. 31, 2004 (JP) ............................. 2004-102827

(51) Int. Cl.
G02B 6/02 (2006.01)
C03B 37/023 (2006.01)

(52) U.S. Cl. ........................................ 385/123; 65/385

(58) Field of Classification Search ......... 385/123–128; 264/1.24

See application file for complete search history.

(56) References Cited

U.S. PATENT DOCUMENTS

| | | |
|---|---|---|
| 5,541,247 A | 7/1996 | Koike |
| 7,031,582 B2 * | 4/2006 | Nakamura et al. .......... 385/128 |
| 7,099,546 B2 * | 8/2006 | Andrieu et al. ............. 385/124 |
| 2003/0044136 A1 | 3/2003 | Nakamura et al. |

FOREIGN PATENT DOCUMENTS

| | | | |
|---|---|---|---|
| JP | 61-130904 A | | 6/1986 |
| JP | 06-239536 | * | 8/1994 |
| JP | 6-239536 A | | 8/1994 |
| JP | 7-27928 A | | 1/1995 |
| JP | 7-234322 A | | 9/1995 |
| JP | 7-234324 A | | 9/1995 |
| JP | 3332922 B2 | | 7/2002 |
| JP | 2004-212870 A | | 7/2004 |
| JP | 2005-31138 A | | 2/2005 |
| WO | WO 01/51977 A2 | | 7/2001 |

* cited by examiner

Primary Examiner—Charlie Peng
(74) Attorney, Agent, or Firm—Sughrue Mion, PLLC

(57) ABSTRACT

A preform (15) having a clad part of PVDF and a core part of PMMA is manufactured. The preform (15) is partially heated in a heating furnace (74) of 240° C. The preform (15) is subject to the melt-drawing process to form a plastic optical fiber (17). The drawing tension to the preform (15) is measured by use of a drawing tension measure device (76). Based on the measured value, a drawing roller pair (78) adjusts the drawing tension to be 3.8 MPa. The plastic optical fiber (17) is fed via a dancer roller (82) and rollers (84, 86) toward a bobbin (87) to wind the plastic optical fiber (17). A winding tension measure device (85) measures the winding tension to the POF (17). Based on the measured value, the dancer roller (82) changes its position to adjust the winding tension to be 2.5 MPa.

9 Claims, 7 Drawing Sheets

PLASTIC OPTICAL FIBER AND METHOD FOR MANUFACTURING THE SAME

TECHNICAL FIELD

The present invention relates to a plastic optical fiber and a method for manufacturing the plastic optical fiber.

BACKGROUND ART

Recent development in communication industry, the demand for the optical fiber with lower transmission loss and low manufacture cost has been increased. A plastic optical part has merits of design facility and low manufacture cost, compared with a glass optical part with identical structure, so the plastic optical part has been recently utilized as an optical fiber, an optical lens element, an optical waveguide and so forth. Especially, a plastic optical fiber (referred to as "POF"), entirely composed of a plastic is suitable for manufacture of the optical fiber with large diameter at a low cost, because the POF has advantages in excellent flexibility, light weight and high machinability, compared with the glass optical fiber. Accordingly, it is planned to utilize the plastic optical fiber as an optical transmission medium for short-distance purpose in which the transmission loss is small (for example, Japanese Laid-Open Patent Publication (JP-A) No. 61-130904).

The POF is composed of a core part formed from a plastic, and an outer shell (referred to as "clad" or "clad part") that is formed from a plastic having lower refractivity than the core part. The POF is manufactured, for example, by forming a tubular clad part (referred to as "clad pipe") by melt-extrusion, and by forming the core part in the clad pipe. A graded index (GI) type POF, in which the refractive index in the core part gradually decreases from the center to the surface of the core part, has high transmission band and high transmission capacity. Various methods for manufacture of the GI type POF are disclosed. For instance, U.S. Pat. No. 5,541,247 (counterpart of Japan Patent No. 3332922) describes a method to manufacture the GI type POF by forming an optical fiber base body (hereinafter referred to "preform") by use of interfacial gel polymerization, and then by melt-drawing the preform in a heating furnace.

In order to increase the machineability of the POF, the preform is drawn by melt drawing under the condition in which the diameter of the POF is 100 μm or less and the drawing tension is 10 g or more, as described in JP-A No. 07-234322. Moreover, JP-A No. 07-234324 sets the drawing tension of 100 g or less in the melt-drawing process for the purpose of preventing decrease in the transmission loss that is caused by shrinkage of the heated POF.

In the manufacture of the POF, the POF is continuously wound around a bobbin, for example, for keeping the POF. Especially, storage of the rolled POF for a long time causes to increase the transmission loss of the POF even at the room temperature. Such problem cannot be solved by adjusting the drawing tension as described in JP-A Nos. 07-234322 and 07-234324, so it is required to keep the transmission loss while the rolled POF is stored.

An object of the present invention is to provide a method to manufacture a plastic optical fiber with low transmission loss, capable of controlling the transmission loss of the POF while the POF is stored for a long time.

Another object of the present invention is to provide a plastic optical fiber manufactured by such manufacturing method.

DISCLOSURE OF INVENTION

In order to achieve the above objects, the inventors have found out that the polymer molecules in the POF are oriented when a heated POF is supplied with tension, especially just after the melt-drawing process in which heat and tension are applied to the polymer. While the rolled POF is in storage, the molecules in the POF are less oriented so that the POF gets shrunk in the lengthwise direction in which the orientation of the polymer becomes relaxed, and thus the rolled POF gets tightened. Thereby, the POF is deformed during storage of POF, so the transmission loss of the POF becomes worse. In order to solve this problem, the inventors has found out that the POF becomes less shrunk in storage by adjusting the tension in the drawing process and the winding process. Thereby, it is possible to obtain the POF with high machineability and small transmission loss.

According to the present invention, the plastic optical fiber is manufactured by winding the heated plastic optical fiber with a winding tension under the condition that the shrinkage of the POF just after the winding process is 0.10% or smaller. The diameter of the plastic optical fiber is preferably 1000 μm or smaller. The winding tension is preferably 0.5 MPa to 5 Mpa, more preferably 0.6 MPa to 4.0 MPa, and most preferably 0.7 MPa to 3.5 MPa.

In a preferable embodiment, a tension adjustment process to adjust the winding tension is provided. The adjustment tension provided in the tension adjustment process is preferably different from the winding tension. The adjustment tension is preferably 1.5 MPa to 7.0 MPa, more preferably 2.0 MPa to 6.0 MPa, and most preferably 2.0 MPa to 5.0 MPa. It is preferable to provide the heated plastic optical fiber by the melt-drawing process of a plastic optical fiber base material. It is preferable that a soft material is wound around a bobbin body to wind the plastic optical fiber, and the hardness of the soft material measured by the type E Durometer (JIS K6253) is 10 to 70.

The clad part of the plastic optical fiber is preferably formed from fluorine resin, and more preferably, the clad part has polyvinylidene fluoride (PVDF) as the main component. The core part of the plastic optical fiber is preferably formed from acrylic resin. The core part is preferably the graded index type core in which the refractive index decreases from the center to the surface thereof. The plastic optical fiber manufactured by the above method has the shrinkage of 0.10% or less just after winding the plastic optical fiber.

According to the present invention, since the shrinkage of the plastic optical fiber after the winding process is 0.10% or smaller, it is possible to control the transmission loss of the plastic optical fiber in storage. Even when the plastic optical fiber is stored for a long period (3 days to 7 days, for example) under the temperature of 25° C. and the humidity of 50 RH %, the transmission loss of the plastic optical fiber does not become worse.

In addition, since the winding tension and the adjustment tension are controlled, it is possible to prevent to increase the transmission loss of the plastic optical fiber in storage. Even when the plastic optical fiber is stored for a long period (3 days to 7 days, for example) under the temperature of 25° C. and the humidity of 50 RH %, the transmission loss of the plastic optical fiber does not become worse. Moreover, it is possible to reduce fluctuation of the diameter of the plastic optical fiber, and to reduce shrinkage in the lengthwise direction.

Besides the drawing process, the present invention is also applicable to a coating process or a heating process to remove a volatile substance contained in the plastic optical fiber.

BEST MODE FOR CARRYING OUT THE INVENTION

Figure 1:
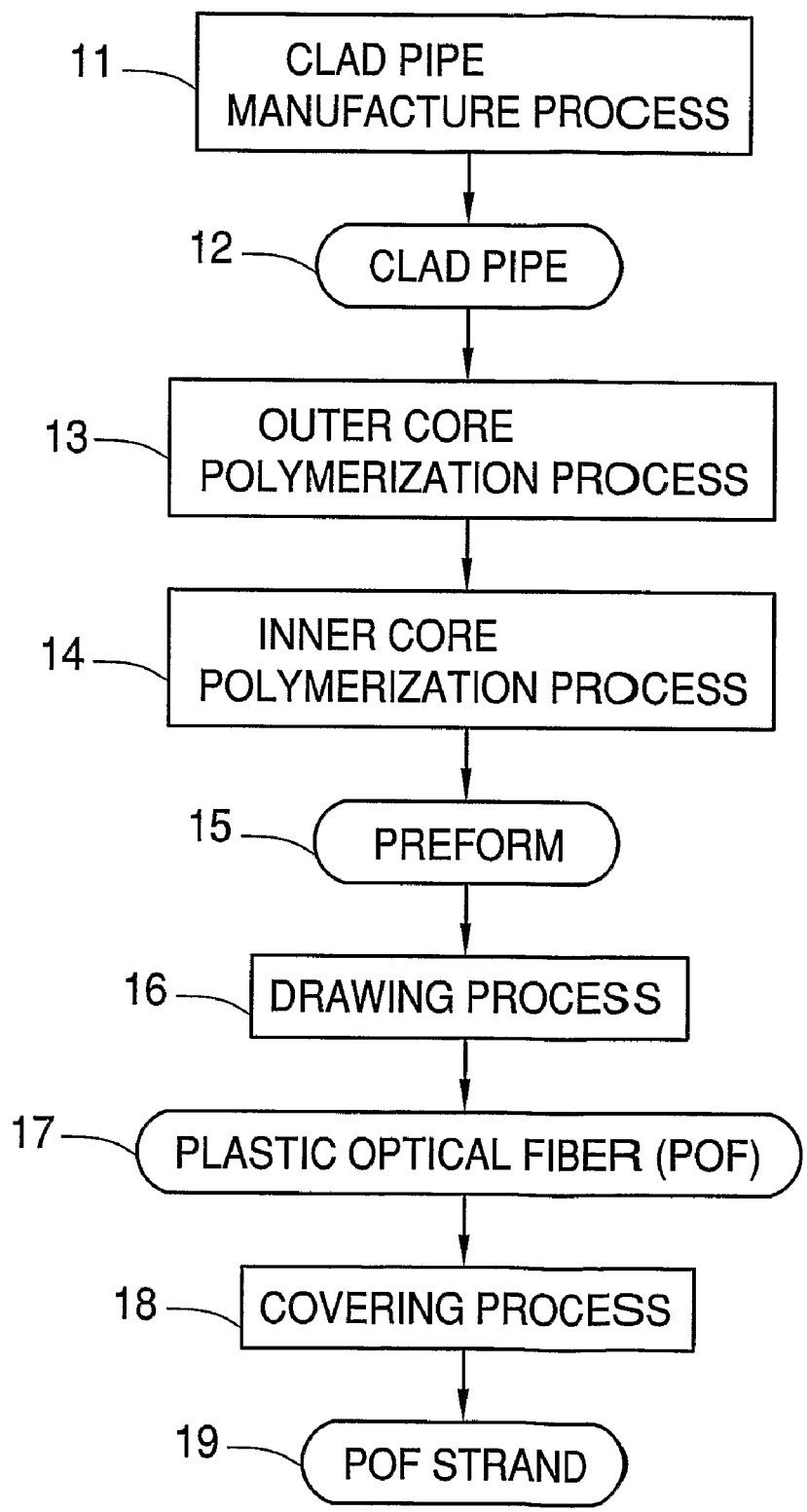
FIG. 1 is a flow chart of a manufacture method of a plastic optical fiber.

In a preferable embodiment to supply heat and tension to a plastic optical fiber, a melt-drawing process to draw a plastic optical fiber base material will be explained. The tension to draw the optical fiber strand from a molten plastic optical fiber base material affects the melt-drawing process before adjusting the winding tension for winding the plastic optical fiber. In this preferred embodiment, the tension in the drawing process is referred to as the drawing tension. The plastic optical fiber has the core part and the clad part both of which are formed from polymers. In this preferable embodiment, the POF (plastic optical fiber) is comprised of the core part and the clad part.

FIG. 1 is the flow chart of the manufacture method of the POF. In a clad pipe manufacturing process 11, a clad pipe 12 is produced by melt-extrusion of the polymers as the raw material. The clad pipe manufacturing process 11 will be described in detail. Then, in an outer core polymerization process 13, an outer core 20a (see FIG. 5A) is formed on the inner surface of the clad pipe 12. After preparing an outer core formation solution (outer core solution) including polymerizable composition, the outer core solution is poured into the clad pipe 12 to carry out polymerization of the outer core. Then, in an inner core polymerization process 14, an inner core 20b (see FIG. 5A) is formed in the outer core 20a. After preparing an inner core formation solution (inner core solution), the inner core solution is poured into the clad pipe 12 having the outer core 20a. The inner core 20a is formed by polymerization of the inner core solution. A preform 15 is obtained by forming the outer core 20a and the inner core 20b that consists of the core part 20.

In a drawing process 16 which will be described in detail, the preform 15 is heated and subject to the melt-drawing process to produce the POF 17. Although the POF 17 itself can be used as an optical transmission medium, the POF 17 is preferably coated with a coating layer for protecting the surface of the POF 17 and for easier handling. After forming the coating layer around the POF 17 in a coating process 18, a plastic optical fiber strand 19 (referred to as "optical fiber strand") is obtained. The optical fiber strand 19 is also referred to as a plastic optical fiber cable.

(Core Part)

As the raw material of the core part, it is preferable to select a polymerizable monomer that is easily bulk polymerized. Examples of the raw materials with high optical transmittance and easy bulk polymerization are (meth)acrylic acid esters [(a) (meth)acrylic ester without fluorine, (b) (meta)acrylic ester containing fluorine], (c) styrene type compounds, (d) vinyl esters, polycarbonates, or the like. The core part may be formed from homopolymer composed of one of these monomers, from copolymer composed of at least two kinds of these monomers, or from a mixture of the homopolymer(s) and/or the copolymer(s). Among them, (meth)acrylic acid ester can be used as a polymerizable monomer.

Concretely, examples of the (a) (meth)acrylic ester without fluorine as the polymerizable monomer are methyl methacrylate (MMA); ethyl methacrylate; isopropyl methacrylate; tert-butyl methacrylate; benzyl methacrylate (BzMA); phenyl methacrylate; cyclohexyl methacrylate, diphenylmethyl methacrylate; tricyclo [$5.2.1.0^{2.6}$] decanyl methacrylate; adamanthyl methacrylate; isobonyl methacrylate; methyl acrylate; ethyl acrylate; tert-butyl acrylate; phenyl acrylate, and the like. Examples of (b) (meth)acrylic ester with fluorine are 2,2,2-trifluoroethyl methacrylate; 2,2,3,3-tetrafluoro propyl methacrylate; 2,2,3,3,3-pentafluoro propyl methacrylate; 1-trifluoromethyl-2,2,2-trifluoromethyl methacrylate; 2,2,3,3,4,4,5,5-octafluoropenthyl methacrylate; 2,2,3,3,4,4,-hexafluorobutyl methacrylate, and the like. Further, in (c) styrene type compounds, there are styrene; α-methylstyrene; chlorostyrene; bromostyrene and the like. In (d) vinylesters, there are vinylacetate; vinylbenzoate; vinylphenylacetate; vinylchloroacetate; and the like. The polymerzable monomers are not limited to the monomers listed above. Preferably, the kinds and composition of the monomers are selected such that the refractive index of the homopolymer or the copolymer in the core part is similar or higher than the refractive index in the clad part. As the polymer for the raw material, polymethyl methacrylate (PMMA), which is a transparent resin, is more preferable.

When the POF 17 is used for near infrared ray, the C—H bond in the optical member causes absorption loss. By use of the polymer in which the hydrogen atom (H) of the C—H bond is substituted by the heavy hydrogen (D) or fluorine (F), the wavelength range to cause transmission loss shifts to larger wavelength region. U.S. Pat. No. 5,541,247 teaches the examples of such polymers, such as deuteriated polymethylmethacrylate (PMMA-d8), polytrifluoroethylmethacrylate (P3FMA), polyhexafluoro isopropyl-2-fluoroacrylate (HFIP2-FA), and the like. Thereby, it is possible to reduce the loss of transmission light. It is to be noted that the impurities and foreign materials in the monomers that causes dispersion should be sufficiently removed before polymerization so as to keep the transparency of the POF 17 after polymerization.

(Clad Part)

In order that the transmitted light in the core part is completely reflected at the interface between the core part and the clad part, the material for the clad part is required to have smaller refractive index than the core part and exhibits excellent fitness to the core part. If there is irregularity between the core part and the clad part, or if the material for the clad part does not fit the core part, another layer may be provided between the core part and the clad part. For example, an outer core layer, formed on the surface of the core part (inner wall of the tubular clad pipe) from the same composition as the matrix of the core part, can improve the interface between the core part and the clad part. The description of the outer core layer will be explained later. Instead of the outer core layer, the clad part may be formed from the polymer having the same composition as the matrix of the core part.

A material having excellent toughness, moisture resistance and heat-resistance is preferable for the clad part. For example, a polymer or a copolymer of the monomer including fluorine is preferable. As the monomer including fluorine, vinylidene fluoride (PVDF) is preferable. It is also preferable to use a fluorine resin obtained by polymerizing one kind or more of polymerizable monomer having 10 wt % of vinylidene fluoride.

In the event of forming the clad part of the polymer by melt-extrusion, the viscosity of the molten polymer needs to be appropriate. The viscosity of the molten polymer is related to the molecular amount, especially the weight-average molecular weight. In this preferable embodiment, the weight-average molecular weight is preferably 10,000 to 1,000,000, and more preferably 50,000 to 500,000.

It is also preferable to protect the core part from moisture. Thus, a polymer with low water absorption is used as the material for the clad part. The clad part may be formed from the polymer having the saturated water absorption (water absorption) of less than 1.8%. More preferably, the water absorption of the polymer is less than 1.5%, and most preferably less than 1.0%. The outer core layer is preferably formed from the polymer having similar water absorption. The water absorption (%) is obtained by measuring the water absorption after soaking the sample of the polymer in the water of 23° C. for one week, pursuant to the ASTM D 570 experiment.

(Polymerization Initiators)

In polymerizing the monomer to form the polymer as the core part and the clad part, polymerization initiators can be added to initiate polymerization of the monomers. The polymerization initiator to be added is appropriately chosen in accordance with the monomer and the method of polymerization. Examples of the polymerization initiators that generate radicals are peroxide compounds, such as benzoil peroxide (BPO); tert-butylperoxy-2-ethylhexanate (PBO); di-tert-butylperoxide (PBD); tert-butylperoxyisopropylcarbonate (PBI); n-butyl-4,4-bis(tert-butylperoxy)valarate (PHV), and the like. Other examples of the polymerization initiators are azo compounds, such as 2,2'-azobisisobutylonitril; 2,2'-azobis(2-methylbutylonitril); 1,1'-azobis(cyclohexane-1-carbonitryl); 2,2'-azobis(2-methylpropane); 2,2'-azobis(2-methylbutane) 2,2'-azobis(2-methylpentane); 2,2'-azobis(2,3-dimethylbutane); 2,2'-azobis(2-methylhexane); 2,2'-azobis (2,4-dimethylpentane); 2,2'-azobis (2,3,3-trimethylbutane); 2,2'-azobis(2,4,4-trimethylpentane); 3,3'-azobis(3-methylpentane); 3,3'-azobis(3-methylhexane); 3,3'-azobis(3,4-dimethypentane); 3,3'-azobis(3-ethylpentane); dimethyl-2,2'-azobis(2-methylpropionate); diethyl-2,2'-azobis(2-methylpropionate); di-tert-butyl-2,2'-azobis(2-methylpropionate), and the like. Note that the polymerization initiators are not limited to the above substances. More than one kind of the polymerization initiators may be combined.

(Chain Transfer Agent)

The polymerizable composition for the clad part and the core part preferably contain a chain transfer agent for mainly controlling the molecular weight of the polymer. The chain transfer agent can control the speed and degree of polymerization in forming the polymer from the polymerizable monomer, and thus it is possible to control the molecular weight of the polymer. For instance, in drawing the preform to manufacture the POF, adjusting the molecular weight by the chain transfer agent can control the mechanical properties of the POF in the drawing process. Thus, adding the chain transfer agent makes it possible to increase the productivity of the POF.

The kind and the amount of the chain transfer agent are selected in accordance with the kinds of the polymerizable monomer. The chain transfer coefficient of the chain transfer agent to the respective monomer is described, for example, in "Polymer Handbook, 3$^{rd}$ edition", (edited by J. BRANDRUP & E. H. IMMERGUT, issued from JOHN WILEY&SON). In addition, the chain transfer coefficient may be calculated through the experiments in the method described in "Experiment Method of Polymers" (edited by Takayuki Ohtsu and Masayoshi Kinoshita, issued from Kagakudojin, 1972).

Preferable examples of the chain transfer agent are alkylmercaptans [for instance, n-butylmercaptan; n-pentylmercaptan; n-octylmercaptan; n-laurylmercaptan; tert-dodecylmercaptan, and the like], and thiophenols [for example, thiophenol; m-bromothiophenol; p-bromothiophenol; m-toluenethiol; p-toluenethiol, and the like]. It is especially preferable to use n-octylmercaptan, n-laurylmercaptan, and tert-dodecylmercaptan in the alkylmercaptans. Further, the hydrogen atom on C—H bond may be substituted by the fluorine atom (F) or a deuterium atom (D) in the chain transfer agent. Note that the chain transfer agents are not limited to the above substances. More than one kind of the chain transfer agents may be combined.

(Refractive Index Control Agent)

The refractive index control agent may be preferably added to the polymerizable composition for the core part. It is also possible to add the refractive index control agent to the polymerizable composition for the clad part. The core part having refractive index profile can be easily formed by providing the concentration distribution of the refractive index control agent. Without the refractive index control agent, it is possible to form the core part having refractive index profile by providing the profile in the co-polymerization ratio of more than one kind of the polymerizable monomers in the core part. But in consideration of controlling the composition of the copolymer, adding the refractive index control agent is preferable.

The refractive index control agent is referred to as "dopant". The dopant is a compound that has different refractive index from the polymerizable monomer to be combined. The difference in the refractive indices between the dopant and the polymerizable monomer is preferably 0.005 or more. The dopant has the feature to increase the refractive index of the polymer, compared to one that does not include the dopant. In comparison of the polymers produced from the monomers as described in Japanese Patent Publication No. 3332922 and Japanese Patent Laid-Open Publication No. 5-173026, the dopant has the feature that the difference in solution parameter is 7 $(cal/cm^3)^{1/2}$ or smaller, and the difference in the refractive index is 0.001 or higher. Any materials having such features may be used as the dopant if such material can stably exist with the polymers, and the material is stable under the polymerizing condition (such as temperature and pressure conditions) of the polymerizable monomers as described above.

This embodiment shows the method to form refractive index profile in the core by controlling the direction of polymerization by interface gel polymerizing method, and by providing density gradation of the refractive index control agent as the dopant during the process to form the core part from the polymerizable composition mixed with the dopant. Hereinafter, the core having the refractive index profile will be referred to as "graded index core". Such graded index core is used for the graded index type plastic optical fiber (GI type POF) having wide range of transmission band.

The dopant may be polymerizable composition, and in that case, it is preferable that the copolymer having the dopant as copolymerized component increases the refractive index in comparison of the polymer without the dopant. An example of such copolymer is MMA-BzMA copolymer.

As described in Japanese Patent Publication No. 3332922 and Japanese Patent Laid-Open Publication No. 11-142657, examples of the dopants are benzyl benzoate (BEN); diphenyl sulfide (DPS); triphenyl phosphate (TPP); benzyl n-butyl phthalate (BBP); diphenyl phthalate (DPP); diphenyl (DB); diphenylmethane (DPM); tricresyl phosphate (TCP); diphenylsoufoxide (DPSO); diphenyl sulfide derivative; dithiane derivative. Among them, BEN, DPS, TPP, DPSO, diphenyl sulfide derivative and dithiane derivative are preferable. In order to improve the transparency in the longer wavelength range, it is possible to use the compounds in which the hydrogen atom is substituted by the deuterium. Example of the polymerizable composition is tribromophenyl methacrylate. A polymerizable composition as the dopant is advantageous in heat resistance although it would be difficult to control various properties (especially optical property) because of copolymerization of polymerizable monomer and polymerizable dopant.

It is possible to control the refractive index of the POF by controlling the density and distribution of the refractive index control agent to be mixed with the core. The amount of the refractive index control agent may be appropriately chosen in accordance with the purpose of the POF, the core material, and the like. More than one kind of the refractive index control agents can be added.

(Other Additives)

Other additives may be contained in the core part and the clad part so far as the transmittance properties do not decrease. For example, the additives may be used for increasing resistance of climate and durability. Further, induced emissive functional compounds may be added for amplifying the optical signal. When such compounds are added to the monomers, weak signal light is amplified by excitation light so that the transmission distance increases. Therefore, the optical member with such additive may be used as an optical fiber amplifier. These additives may be contained in the core part and/or the clad part by polymerizing the additives with the monomers.

(Method for Manufacturing Preform)

The method for manufacturing a graded index type plastic optical fiber base body having the core part and the clad part will be described as a preferable embodiment of the present invention. The following two embodiments of manufacture methods do not limit the present invention.

In the first embodiment, the polymerizable compositions for the clad part are polymerized to form a hollow pipe. Instead, the hollow cylindrical pipe is formed by melt extrusion of thermoplastic resin (1st process). The core part is formed by interfacial gel polymerization of the polymerizable composition for the core part in the hollow cylindrical pipe, so the preform having the core part and the clad part is produced (2nd process). The preform is subject to change its shape by the method and apparatus according to the present invention (3rd process) to manufacture the POF.

In the second embodiment, the outer core part is formed inside the hollow pipe corresponding to the clad part of the first embodiment (1'st process). In this embodiment, the core part located in the center of the preform is referred to as the inner core part. In the following description, the term "core part" also indicates the "inner core part".

For instance, the hollow cylindrical pipe is formed from resin including fluorine, such as polyvinylidene fluoride. The cylindrical pipe including two layers is produced by forming the outer core layer inside the single layer cylindrical pipe by rotational polymerization of the polymerizable composition for the outer core (1'st process). Then, the inner core part is formed in the hollowed area of the double layer cylindrical pipe by the interfacial gel polymerization of the polymerizable composition for the inner core part (2'nd process), so the preform is prepared. After changing the shape of the preform appropriately (3rd process), the POF as the optical member is manufactured.

Although the double layered cylindrical pipe according to the second embodiment is formed step by step as described above, it is possible to form the double layered cylindrical pipe by a single step of melt extrusion of resin including fluorine for the clad part and the polymerizable composition for the outer core part.

The composition of the polymerizable monomers for the clad part is preferably the same as that for the core part according to the first embodiment. In the second embodiment, the composition of the polymerizable monomers for the outer core part is preferably the same as that for the inner core part. The composition ratio of the polymerizable monomers is not necessary the same, and an accessory ingredient to be added to the polymerizable monomers is not necessary the same. Providing the same kinds of the polymerizable monomers can improve the optical transmittance and the adhesiveness at the interface between the clad part and the core part (or at the interface between the outer core part and the inner core part). When the resin of the clad part or the outer core part is copolymer in which the component thereof has different refractive indices, it is easily possible to provide a large difference in the refractive index between the core part and the clad part or the inner core part. As a result, the graded index structure is easily provided.

In the second embodiment, the outer core layer between the clad part and the core part can prevent to decrease the adhesiveness and the productivity of the POF caused by the difference of the materials for the clad part and the core part. Thus, it is possible to increase the materials that can be used for the clad part and the core part. The thickness and the diameter of the cylindrical pipe corresponding to the clad part can be controlled in the melt extrusion process of commercial fluorine resin or in the polymerization process of the rotational polymerizable composition. In the hollow area of cylindrical pipe, the polymerizable composition for the outer core part is subject to rotational polymerization, so the outer core part is formed inside the cylindrical pipe. The same structure may be formed by co-extrusion of the copolymer composed of the fluorine resin and the polymerizable composition.

In these preferable embodiments, the GI type POF is manufactured by providing the concentration profile of the refractive index control agent, the present invention is also applicable to other type of POF. In addition, the concentration profile of the refractive index control agent may be provided by interfacial gel polymerization and rotational gel polymerization, which will be described later.

The preferable amount of the ingredients of the polymerizable composition for the clad part, the outer core part and the inner core part can be determined in accordance of the kind of the ingredients. In general, the amount of the polymerization initiator is preferably 0.005 wt % to 0.5 wt % of the polymerizable monomer, and more preferably 0.01 wt % to 0.5 wt %. The amount of the chain transfer agent is preferably 0.10 wt % to 0.40 wt % of the polymerizable monomer, and more preferably 0.15 wt % to 0.30 wt %. The amount of the refractive index control agent is preferably 1 wt % to 30 wt % of the polymerizable monomer, and more preferably 1 wt % to 25 wt %.

In consideration of the drawing process of the obtained preform, the weight-average molecular weight of the polymer obtained by polymerizing the polymerizable composition for the clad part, the outer core part and the inner core part is preferably 10,000 to 1,000,000. More preferably, the weight-average molecular weight is 30,000 to 500,000. The drawing property of the preform is affected by the molecular weight distribution (MWD), calculated by dividing weight-average molecular weight by number average molecular weight. The preform having large MWD is not preferable because the portion having extremely high molecular weight exhibits bad drawing property, and what is worse, the preform cannot be drawn. Thus, the value of MWD is preferably 4 or smaller, and more preferably 3 or smaller.

Next, each manufacture process according to the first embodiment and the second embodiment (especially the first embodiment) will be described in detail.

(First Process)

In the first process, the single layered cylindrical pipe for the clad part, or the double layered cylindrical pipe for the clad part and the outer core part is produced. Such cylindrical pipe is produced by polymerizing the monomers and shaping it in a tubular form. For example, the cylindrical pipe is produced by the rotational polymerization and the melt-extrusion of the resin.

The hollow cylindrical pipe is formed from the polymerizable composition by the rotational polymerization method in which the polymerizable composition is polymerized while rotating the composition to form the polymer layer in a cylindrical polymerization chamber. For example, after the polymerizable composition for the clad part are put in the polymerization chamber, the polymerization chamber is rotated (preferably, the axis of the polymerization chamber is kept horizontally) and the polymerizable composition is polymerized. Thereby, the clad part is formed inside the cylindrical polymerization chamber. Thereafter, the polymerizable composition for the outer core part is put into the clad part, and the composition is polymerized while rotating the clad part. Thereby, the hollow cylindrical pipe having the outer core part on the inner wall of the clad part is formed.

Before putting the polymerizable composition for the clad part or the outer core part, the polymerizable composition is preferably filtered to remove dust contained in the polymerizable composition. Moreover, it is possible to adjust the viscosity of the raw materials (polymerizable composition) for easy handling, as disclosed in JP-A 10-293215, and to carry out pre-polymerization for shorting the polymerization period, as long as these processes do not cause deterioration in the quality of the preform and the preliminary or the post process do not become complicated. The temperature and the period for the polymerization process are determined in accordance with the monomers and the polymerization initiators to be used for polymerization. Generally, the preferable polymerization period is 5 hours to 24 hours. The preferable polymerization temperature is 60° C. to 150° C. As described in JP-A No. 08-110419, the raw materials may be subject to the preliminary polymerization for increasing its viscosity. Such preliminary polymerization can shorten the polymerization period for forming the cylindrical pipe. The polymerization chamber is preferably a metal or glass chamber with high rigidity, because the cylindrical polymer pipe is distorted if the polymerization chamber is deformed in rotation.

The cylindrical pipe may be formed from pelletized or powdered resin (preferably fluorine resin). After sealing both ends of the cylindrical polymerization chamber containing the pelletized or powdered resin, the polymerization chamber is rotated (preferably, the axis of the polymerization chamber is kept horizontally). Then, by heating the resin at a temperature more than the melting point of the resin, the hollow cylindrical polymer pipe is manufactured. In order to prevent heat, oxidization and decompression by thermal oxidization of the molten resin, the polymerization chamber is preferably filled with inert gas such as nitrogen gas, carbon dioxide gas, argon gas, and so forth. Moreover, it is preferable to dry the resin sufficiently before the polymerization process.

In the event of forming the clad part by extruding the molten polymer, the shape of the polymer (cylindrical shape in this embodiment) after polymerization is appropriately controlled by use of molding technique like extrusion. The apparatus for the melt extrusion of the polymer has two types, the inner sizing die type and the outer die decompression absorption type.

Figure 2:
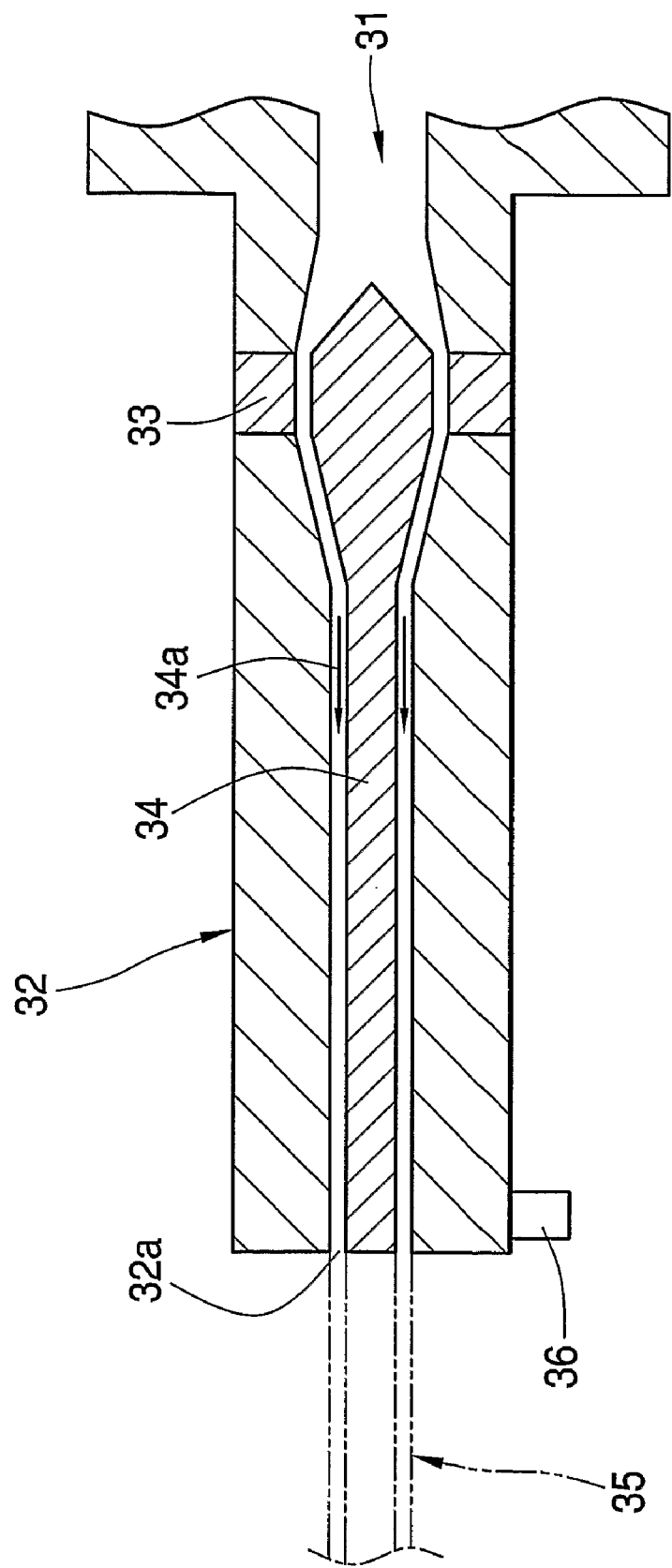
FIG. 2 is a sectional view of essential portion of an apparatus to manufacture a clad part of the plastic optical fiber.

Referring to FIG. 2, the melt extrusion apparatus of the inner sizing die type is described. In the melt extrusion apparatus, a single screw extruder (not illustrated) extrudes a raw polymer 31 for the clad part to a die body 32. In the die body 32, a guide member 33 for changing the shape of the raw polymer 31 into the cylindrical shape is provided. Through the guide member 33, the raw polymer 31 passes a flowing passage 34a between the die body 32 and an inner rod 34. The raw polymer 31 is extruded from an outlet 32a of the die body 32 so that a clad part 35 having the hollow cylindrical pipe is formed. Although there is no limitation to the extrusion speed of the clad part 35, in terms of productivity and the uniformity of the clad part 35, the extrusion speed is preferably 1 cm/min to 100 cm/min.

The die body 32 preferably comprises a heater for heating the raw polymer 31. For instance, one or more heater (for instance, heat generating device by use of steam, thermal oil and an electric heater) are provided along the flowing passage 34a so as to coat the die body 32. A thermometer 36 is provided in the vicinity of the outlet 32a of the die body 32. In order to control the heating temperature, the thermometer 36 measures the temperature of the clad part 35 near the outlet 32a.

The heating temperature in the die body 32 is not limited. Concretely, when the raw polymer 31 is PVDF, the heating temperature is preferably 200° C. to 290° C. The temperature of the clad part 35 is preferably 40° C. or higher because of reducing the change of the clad shape by rapid change in the temperature. The temperature of the clad 35 may be controlled by a thermostat (for example, a cooler device that utilizes liquid like water, an anti-freezing solution and oil, and an electric cooling device) that is fixed to the die body 32. The clad 35 may be cooled by use of natural cooling of the die body 32. When the heater device is provided with the die body 32, the cooler device is preferably provided in the downstream side of the heater device with respect to the direction to flow the raw polymer 31.

Figure 3:
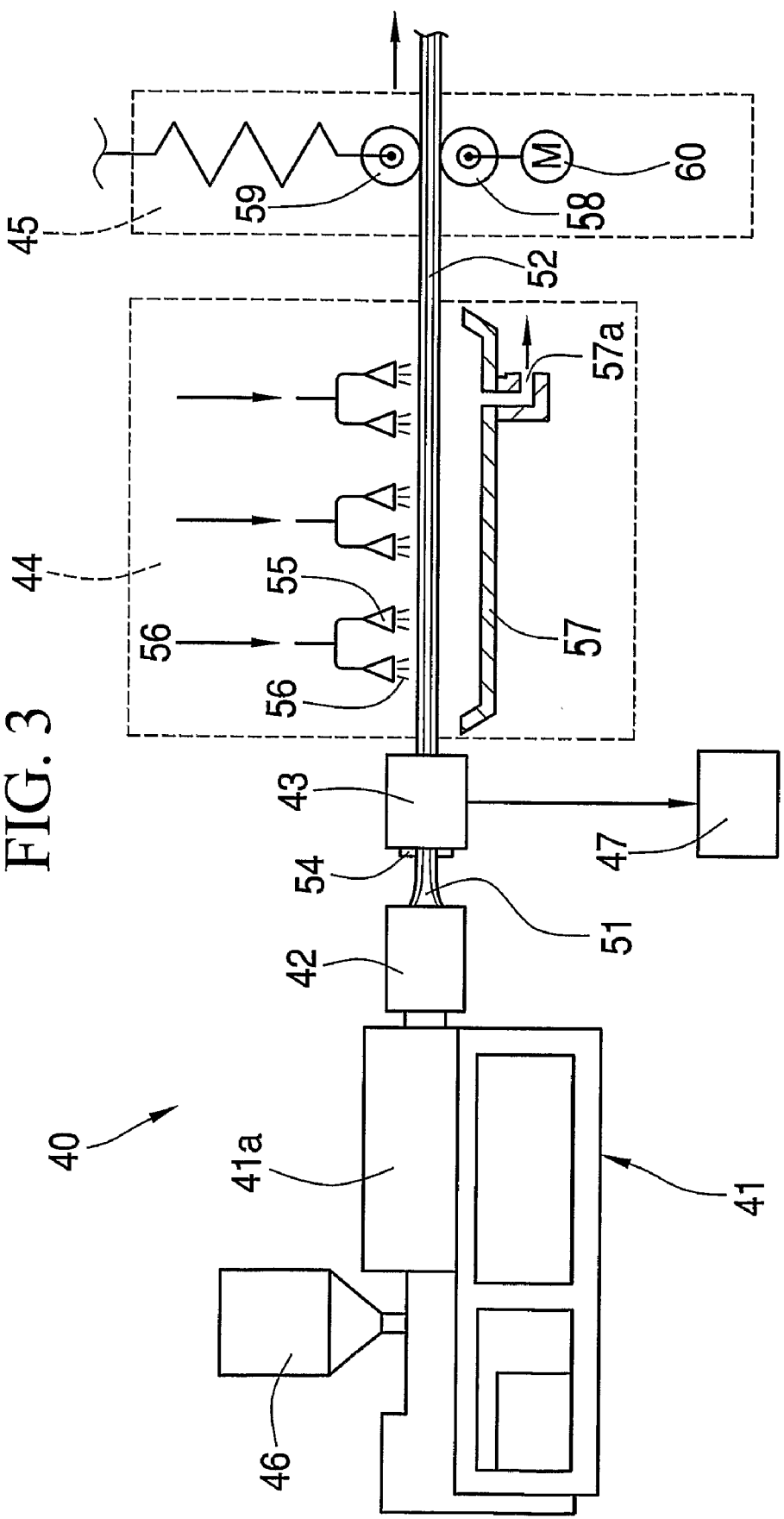
FIG. 3 is a schematic view of the manufacture line of the clad part.
Figure 4:
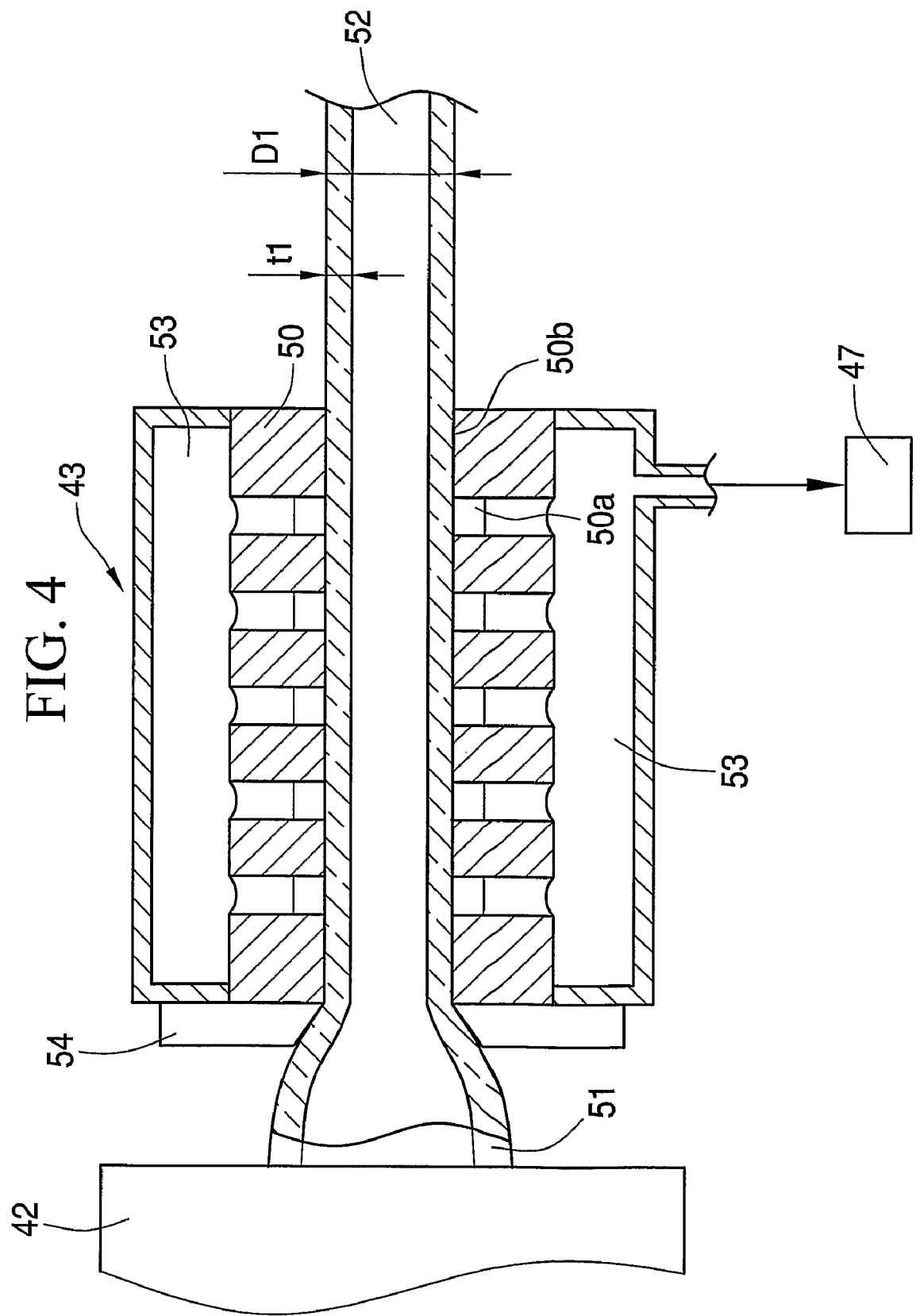
FIG. 4 is a sectional view of essential part of the manufacture line of FIG. 3.

Referring to FIGS. 3 and 4, the melt extrusion apparatus of the outer die decompression absorption type is described. FIG. 3 shows an embodiment of a manufacture line 40 including the melt extrusion apparatus. In FIG. 4, a cross section of a molding die 43 in the manufacture line 40 is illustrated. Referring to FIG. 3, the manufacture line 40 comprises a melt extrusion apparatus 41, an extrusion die 43, a cooler device 44 and a feeding machine 45. The raw polymer supplied from a pellet casting hopper 46 is melted in a melting section 41a provided in the melt extrusion apparatus 41. The molten polymer is extruded by the extrusion die 42, and then supplied to the molding die 43. The molding die 43 is connected with a vacuum pump 47. The extrusion speed S is preferably 0.1 (m/min) to 10 (m/min), more preferably 0.3 (m/min) to 5.0 (m/min), and most preferably 0.4 (m/min) to 1.0 (m/min). The extrusion speed S is not limited to the preferable range mentioned above.

As shown in FIG. 4, the molding die 43 has a molding pipe 50 through which the raw polymer is shaped to form the hollow cylindrical clad 52. There are plural suction holes 50a in the molding pipe 50. The suction holes 50a are connected to a decompression chamber 53, provided outside of the molding pipe 50. When the decompression chamber 53 is decompressed by the vacuum pump 47, the outer wall of the clad 52 comes in close contact with the molding surface (inner surface) of the molding pipe 50, so the thickness of the clad 52 becomes uniform. The pressure in the decompression chamber 53 (absolute pressure) is preferably 20 kPa to 50 kPa, but not limited to this range. In order to regulate the diameter of the clad 52, a throat member (diameter regulation member) 54 is preferably fixed at the entrance of the molding die 43.

The clad 52 through the molding die 52 for shaping is fed to the cooling device 44, in which plural nozzles 55 are provided for spraying cooling water 56 to the clad 52. Thereby, the clad 52 is cooled and becomes solidified. The sprayed cooling water 56 is collected in a water receiver 57, and then ejected through a drain opening 57a. The clad 52 is drawn from the cooling device 44 toward the winding machine 45. The winding machine 45 comprises a drive roller 58 and a pressure roller 59. The winding speed by the feeding machine 45 is controlled by a motor 60 that is connected to the drive roller 58. The clad 52 is sandwiched between the drive roller 58 and the pressure roller 59. The extrusion speed is adjusted by the molding die 43. Moreover the feeding speed of the clad 52 is adjusted by the drive roller 58 and the feeding position of the clad 52 is adjusted by the pressure roller 59. Thereby, it is possible to keep the shape and the thickness of the clad 52. If necessary, the drive roller 58 and the pressure roller 59 may be belt-shaped.

The clad may be composed of plural layers for the purpose of providing functions such as the mechanical strength and incombustibility. In addition, after the hollow cylindrical pipe having the arithmetic average roughness of a certain range is formed, the outer surface of the cylindrical pipe may be coated with fluorine resin or the like.

Figure 5A:
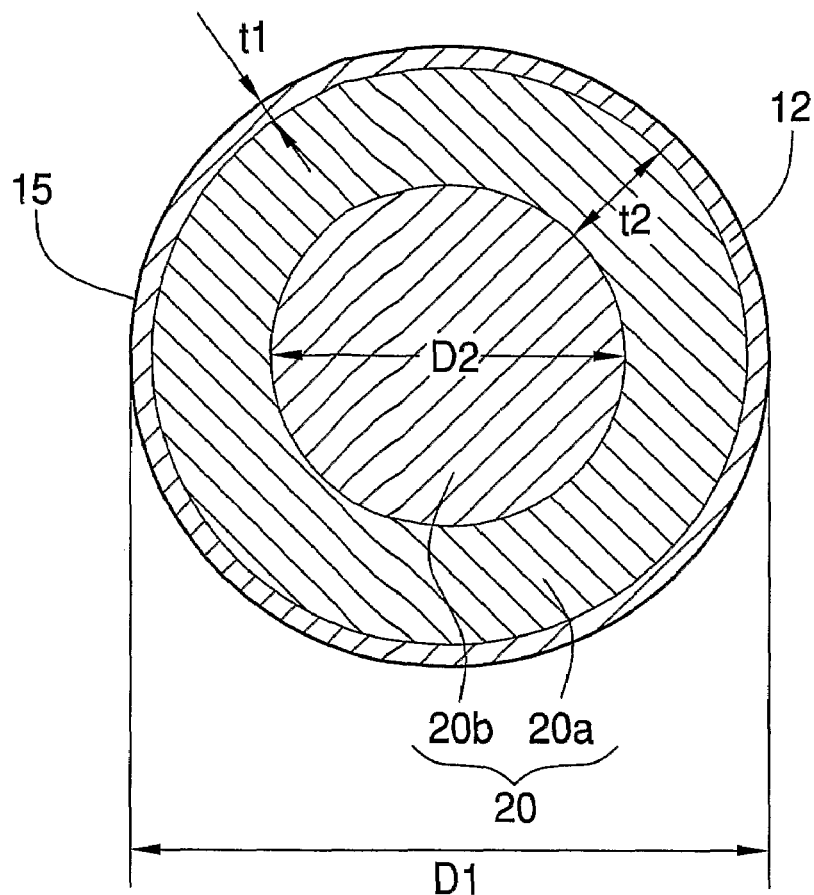
FIG. 5A is a sectional view of a preform for the plastic optical fiber.

In FIG. 5A, the outer diameter D1 of the clad 52 (corresponding to the diameter of the preform 15) is preferably 100 mm or smaller, in consideration of the optical property and the productivity. More preferably, the diameter D1 is between 10 mm to 50 mm. The thickness t1 of the clad 52 can be small as long as the clad 52 can keep its shape. The thickness t1 is preferably 0.1 mm to 20 mm, and more preferably 0.5 mm to 8 mm. These numerical ranges of the outer diameter D1 and the thickness t1 do not limit the present invention.

Examples of the polymerizable monomers as the raw material of the outer core layer are the same as those of the inner core part. The outer core layer is mainly for forming the inner core part, so the thickness of the outer core layer may be small as long as the inner core part can be bulk polymerized. The outer core layer may be merged with the inner core part to form a single core part after the bulk polymerization of the inner core part. Thus, the lower limit of the thickness t2 of the outer core layer before the bulk polymerization is preferably 0.5 mm to 1.0 mm. The upper limit of the thickness t2 may be selected in accordance with the size of the preform, as long as the inner core part has refractive index profile.

The single or double layered cylindrical structure formed from a polymer preferably has a bottom part to close one end of the cylindrical structure for putting the polymerizable composition as the raw material of the core part (inner core part). It is preferable that the bottom part is formed from a material having excellent adhesion and fitness to the polymer of the cylindrical pipe. The bottom part may be formed from the same polymer as the cylindrical structure. The polymer bottom part is formed, for example, by polymerizing a small amount of the polymerizable monomer injected in the polymerization chamber that is kept vertically before rotating the polymerization chamber for polymerization or after forming the hollow cylindrical pipe. It is possible to plug one end of the cylindrical pipe with a material that is chemically stable so as not to melt into the polymerizable composition for the inner core part, or not to affect the polymerization process of the inner core part.

For the purpose of promoting reaction of the remaining monomers and the polymerization initiators after the rotational polymerization, the hollow polymer pipe may be heated at a temperature higher than the temperature in the rotational polymerization process. After the hollow polymer pipe is formed, non-polymerized compounds may be ejected.

(Second Process)

In the second process, the polymerizable monomers in the polymerizable composition filled in the hollow polymer pipe are polymerized to form the core part (inner core part). In the interfacial gel polymerization, the polymerizable monomers are polymerized from the inner wall of the hollow pipe toward the center thereof. When more than one kind of the polymerizable monomer is used, the monomers with higher affinity with the polymer of the hollow pipe are initially polymerized so that such monomers are localized near the inner wall of the hollow pipe. The proportion of the monomers with higher affinity decreases from the surface to the center, while the proportion of other monomers increases. In this way, the proportion of the monomers is gradually changed in the area corresponding to the core part, so the refractive index profile is introduced.

When the monomers with the refractive index control agent are polymerized, the core liquid solidifies the inner wall of the hollow pipe, and the polymers in the inner wall is swelled to form a gel, as described in Japanese Patent No. 3332922. During the polymerization, the monomers with higher affinity to the hollow pipe are localized in the area near the inner wall of the hollow pipe. Thus, the density of the refractive index control agent of the polymer becomes smaller in the area near the inner wall of the hollow pipe, and the density of the refractive index control agent increases from the surface to the center of the core part. In this way, the concentration profile of the refractive index control agent is generated, and thus the refractive index profile is provided in the core part.

The speed and the degree of polymerization of the polymerizable monomers are adjusted by the polymerization initiators and the chain transfer agent to be added if necessary, and thereby the molecular weight of the polymer is adjusted. For instance, in the event of forming the POF by drawing the polymer, by adjusting the molecular weight (preferably 10,000 to 1,000,000, and more preferably 30,000 to 500,000) by use of the chain transfer agent, the mechanical property in the drawing process becomes in a desirable range. Accordingly, the productivity of the POF is improved.

In the second process, the refractive index profile is introduced in the area corresponding to the core part, but the thermal behavior of the polymer changes according to the refractive index. Thus, when the monomers in the core part are polymerized at the same temperature, the response of the volume shrinkage in polymerization becomes different over the area corresponding to the core part due to the difference in thermal behavior. Thus, bubbles are mixed in the preform. It is also possible that microscopic gap is generated in the preform, and that the bubbles are generated in heating and drawing the preform. Too low polymerization temperature causes to decrease polymerization efficiency. Moreover, when the polymerization temperature is too low, the productivity of the preform becomes worse, and the optical transmittance of the manufactured optical part becomes worse due to low optical transparency caused by improper polymerization. On the other hand, if the initial polymerization temperature is too high, the initial polymerization speed is excessively increased. As a result, since the polymer cannot be relaxed to the volume shrinkage in the area of the core part, the bubbles are easily generated in the preform.

In order to prevent the above problems, it is preferable to keep the initial polymerization temperature T1 (° C.) within the following range:

$$(Tb-10)° C. \leq T1(° C.) \leq Tg(° C.)$$

It is to be noted that Tb is the boiling point of the polymerizable monomer, and Tg is the glass transition point (glass transition temperature) of the polymer of the polymerizable monomer. The polymerization speed becomes small by setting the initial polymerization temperature T1 within the above range, so it is possible to improve the relaxation property of the polymer to the volume shrinkage during the initial polymerization.

After the initial polymerization at the temperature T1, the monomers are polymerized at the temperature T2 (° C.) that satisfies the following condition:

$$Tg(° C.) \leq T2(° C.) \leq (Tg+40)(° C.)$$

$$T1(° C.) < T2(° C.)$$

By completing the polymerization after increasing the temperature from T1 to T2, it is possible to prevent deterioration in the optical transparency, and thus to obtain the preform with excellent optical transmittance. In addition, the effect of thermal deterioration and depolymerization of the preform becomes smaller, and it is possible to decrease deviation in the polymer density in the preform, and to improve the transparency of the preform. The polymerization temperature T2 (° C.) is preferably Tg (° C.) to (Tg+30) ° C., and more preferably about (Tg+10) ° C. The polymerization temperature T2 of less than Tg (° C.) cannot obtain such effect. When the polymerization temperature T2 is more than (Tg+40) ° C., the transparency of the preform will decrease because of thermal deterioration and depolymerization. Moreover, in forming the graded index type core part, the refractive index profile in the core part is destroyed, so the properties of the POF are largely decreased.

The polymerizable monomers are preferably polymerized at the polymerization temperature T2 until the polymerization is completed so that the polymerization initiators do not remain. If non-reacted polymerization initiators remaining in the preform are heated in processing the preform, especially in melt drawing process, polymerization initiators are decompressed to generate the bubbles in the preform. So it is preferable that the polymerization initiators are completely reacted. The period of polymerization at the polymerization temperature T2 is preferably equal to or more than the half-life of the polymerization initiators at the temperature T2, although the preferable polymerization period depends on the kind of the polymerization initiators.

The polymerization initiator is preferably a chemical having the ten-hour half-life temperature of (Tb−20) ° C. or higher, wherein Tb is the boiling point of the polymerizable monomer. Polymerizing the monomers at the initial polymerization temperature T1 (° C.) with the polymerization initiator having the ten-hour half-life temperature of equal to or (Tb−20) ° C. can decrease the polymerization speed at the initial stage. In addition, it is preferable to polymerize the monomers at the initial polymerization temperature T1 (° C.) satisfying the above condition for a period equal to or more than 10% of the half-life of the polymerization initiator. Thereby, the polymer can quickly relax to the volume shrinkage by a pressure during the initial polymerization. Setting the above described conditions can decrease the initial polymerization speed, and improves the response to the volume shrinkage in the initial polymerization. As a result, since the amount of the bubbles to be introduced to the preform by the volume shrinkage is decreased, it is possible to improve the productivity. It is to be noted that the ten-hour half-life temperature of the polymerization initiator is the temperature in which the amount of the polymerization initiator becomes half in ten hours by decomposition.

In polymerizing the monomers with the polymerization initiator satisfying the above conditions at the initial polymerization temperature T1 (° C.) for a period of equal to or more than 10% of the half-life of the polymerization initiator, it is possible to keep the initial polymerization temperature T1 (° C.) until the polymerization is completed. But in order to obtain the optical member having high optical transparency, completing the polymerization at the polymerization temperature T2 (° C.) that is higher than the initial polymerization temperature T1 (° C.) is preferable. The preferable temperature of the polymerization temperature T2 (° C.) and the period for polymerization at the temperature T2 (° C.) are mentioned above.

When methyl methacrylate (MMA) with the boiling point Tb of 100 (° C.) is used as the polymerizable monomer in the second process, PBD and PHV can be used as the polymerization initiator with the ten-hour half-life temperature of (Tb−20) ° C. or higher. For example, when MMA is used as the polymerizable monomer and PBD is used as the polymerization initiator, it is preferable to keep the initial polymerization temperature T1 (° C.) at 100-110° C. for 48-72 hours, to increase the temperature to the polymerization temperature T2 (° C.) of 120-140° C., and to carry out polymerization at T2 (° C.) for 24-48 hours. In the event of using PHV as the polymerization initiator, it is preferable to keep the initial polymerization temperature T1 (° C.) at 100-110° C. for 4-24 hours, to increase the temperature to the polymerization temperature T2 (° C.) of 120-140° C., and to carry out polymerization at T2 (° C.) for 24-48 hours. The temperature in the polymerization may be increased step by step or continuously. It is preferable to increase the temperature in the polymerization as quickly as possible.

In the second process, the pressure in the polymerization may be increased or decreased, as described in JP-A No. 09-269424 or Japanese Patent No. 3332922. Moreover, the pressure can be changed during the polymerization. By changing the pressure in the polymerization, it is possible to improve polymerization efficiency at the initial polymerization temperature T1 (° C.), near the boiling point Tb (° C.) and satisfying the above condition, and the polymerization temperature T2 (° C.). In polymerizing the monomer with a pressurized condition (pressurized polymerization), the hollow pipe containing the polymerizable monomer is preferably supported in a hollow portion of a jig. Moreover, carrying out dehydration and degassing in a low pressure condition before polymerization can effectively decrease the bubbles to be generated.

The jig to support the hollow pipe is provide d with a hollow part for inserting the above described hollow pipe, and the hollow part of the jig preferably has the same shape as the hollow pipe. In other words, the jig has preferably a hollow cylindrical shape. The jig can prevent deformation of the hollow pipe during the pressurized polymerization, and can support the hollow pipe enough to relax the shrinkage of the core part as the pressurized polymerization proceeds.

Accordingly, the diameter of the hollow part of the jig is preferably larger than the diameter of the hollow pipe, so the hollow pipe in the jig does not come in contact with the inner wall of the hollow pipe. Compared to the outer diameter of the hollow pipe, the diameter of the hollow part is preferably larger by 0.1% to 40% of the outer diameter of the hollow pipe, and more preferably larger by 10% to 20% of the outer diameter of the hollow pipe.

The jig containing the hollow pipe is set in the polymerization chamber. The longitudinal direction of the hollow pipe in the polymerization chamber is preferably held vertically. After setting the hollow pipe supported by the jig in the polymerization chamber, the polymerization chamber is subject to pressurization. In proceeding pressurized polymerization, the polymerization chamber is preferably pressurized in the atmosphere of inert gas like nitrogen gas. The pressure (gauge pressure) in polymerization is preferably 0.05 MPa to 1.0 MPa in general, although the preferable pressure depends on the type of the monomer to be polymerized.

The method to manufacture the core part is not limited to the above described process. For instance, the inner core (core part) may be formed by rotational polymerization method to carry out interfacial gel polymerization in rotating the monomers for the core part. In the following explanation, the inner core is formed. In the clad pipe having the outer core, the inner core solution is injected. Then, after sealing one end of the clad pipe, the clad pipe is kept in the polymerization chamber horizontally (in the state in which the longitudinal direction of the clad pipe is kept horizontally), the inner core solution is subject to polymerization while the clad pipe is rotated. The inner core may be injected collectively, continuously or successively in the clad pipe. Instead of the GI type POF, a multi step type optical fiber having step-shape refractive index profile by adjusting the amount, composition and polymerization degree of the inner core polymerizable composition. In the preferred embodiment, the above described method of polymerization is referred to as core part rotational polymerization method (core part rotational gel polymerization method).

Compared with the interfacial gel polymerization, the rotational polymerization method can discharge the bubbles to be generated from the core solution because the core solution has larger surface area than the gel. Therefore, the bubbles in the produced preform decreases. In addition, forming the core part by the rotational polymerization method, the preform may have a void in the center. In such case, the void in the preform is filled by the melt drawing process to manufacture a plastic optical member such as the POF. Such preform can be utilized as other type of the optical member such as the plastic lens by closing the void in the preform in the melt drawing process.

The amount of the bubbles to be generated after the polymerization process can be decreased by cooling the preform at a constant cooling speed under the control of the pressure at the stage to complete the second process. In terms of the pressure response of the core part, the pressure polymerization of the core part in the atmosphere of nitrogen gas is preferable. But it is impossible to completely discharge the gas from the preform, and the cooling process will cause rapid shrinkage of the polymer so that the bubble are generated due to the bubble nucleus formed by gas accumulation to the void in the preform. In order to prevent such problem, it is preferable to control the cooling speed. The cooling speed is preferably 0.001° C./min to 3° C./min, more preferably 0.01° C./min to 1° C./min. The cooling process can be carried out by two steps or more in accordance with the progress of the volume shrinkage of the polymer in the core part in changing the temperature to the glass transition temperature Tg (° C.). In that case, it is preferable to set a high cooling speed just after polymerization and then gradually reduce the cooling speed.

The preform after the above described processes has uniform refractive index distribution and sufficient optical transparency. In addition, the amount of the bubbles and microscopic void is reduced. The flatness of the interface between the clad part (or the outer core part) and the core part becomes excellent. Although the above manufacture method describes the cylindrical preform with a single outer core layer, the outer core part having two or more layers may be formed. After the optical fiber is manufactured by the interfacial gel polymerization and the drawing processes, the outer core part may be integrated with the inner core part.

Figure 5B:
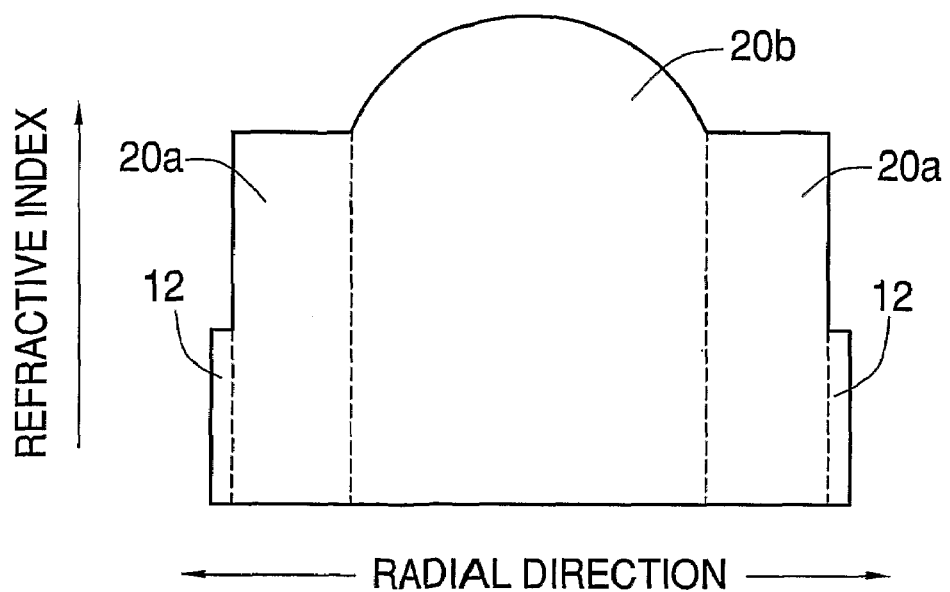
FIG. 5B is a graph to show the refractive index profile in the radial direction of the preform.

In FIG. 5A, the cross section of the preform 15 is illustrated. For the purpose of obtaining excellent transmittance, the inner core 20b is preferably the graded index type (GI type) in which the refractive index decreases from the center to the periphery (see FIG. 5B). The outer core 20a is formed from a material capable of interfacial gel polymerization in forming the inner core 20b. The shape of the preform 15 is not limited. The outer diameter D1 (mm) of the clad pipe 12 is preferably 10 mm to 50 mm, and the thickness t1 of the clad pipe 12 is preferably 0.2 mm to 10 mm. It is preferable to form the inner core 20b with the diameter D2 (mm) of 3 mm to 25 mm after forming the outer core having the thickness t2 (mm) of 2 mm to 10 mm.

Various kinds of the plastic optical members can be manufactured by processing the preform. For instance, slicing the preform in the direction perpendicular to the longitudinal direction can manufacture disk-shaped or cylindrical shaped lenses with flat surfaces. The POF can be manufactured by melt-drawing the preform. When the core part of the preform has refractive index profile, the POF with uniform optical transmittance can be stably manufactured with high productivity.

(Third Process)

In the melt-drawing as the third process, the preform is heated by passing through a heating chamber (cylindrical heating chamber, for example), and drawing the molten preform. The heating temperature can be determined in accordance with the material of the preform. In general, the heating temperature is preferably 180° C. to 250° C. The drawing condition (such as the drawing temperature) can be determined in accordance with the materials and the diameter of the POF. In forming the GI type POF having the refractive index profile in the core part, it is necessary to carry out the drawing processes evenly in the radial direction of the POF, in order not to destroy the refractive index profile. Thus, the cylindrical heater capable of heating the preform uniformly over the section thereof is preferably used for the heating process. The heating chamber preferably has a distribution in the temperature in the drawing direction of the preform. In order to prevent to destroy the refractive index profile, the heating area in the preform is preferably as small as possible. In other words, it is preferable to carry out preheat process at the position before the heating area, and to carry out cooling process at the position after the heating area. The heating device for the heating process may be a laser device that can supply high energy in a small heating area.

The drawing apparatus for the drawing process preferably has a core position adjusting mechanism to keep the position of the core, in order to keep the circularity of the preform. It is possible to control the orientation of the polymer of the POF by adjusting the drawing condition, and thus possible to control the mechanical property (such as the bending quality), thermal shrinkage, and so forth.

Figure 6:
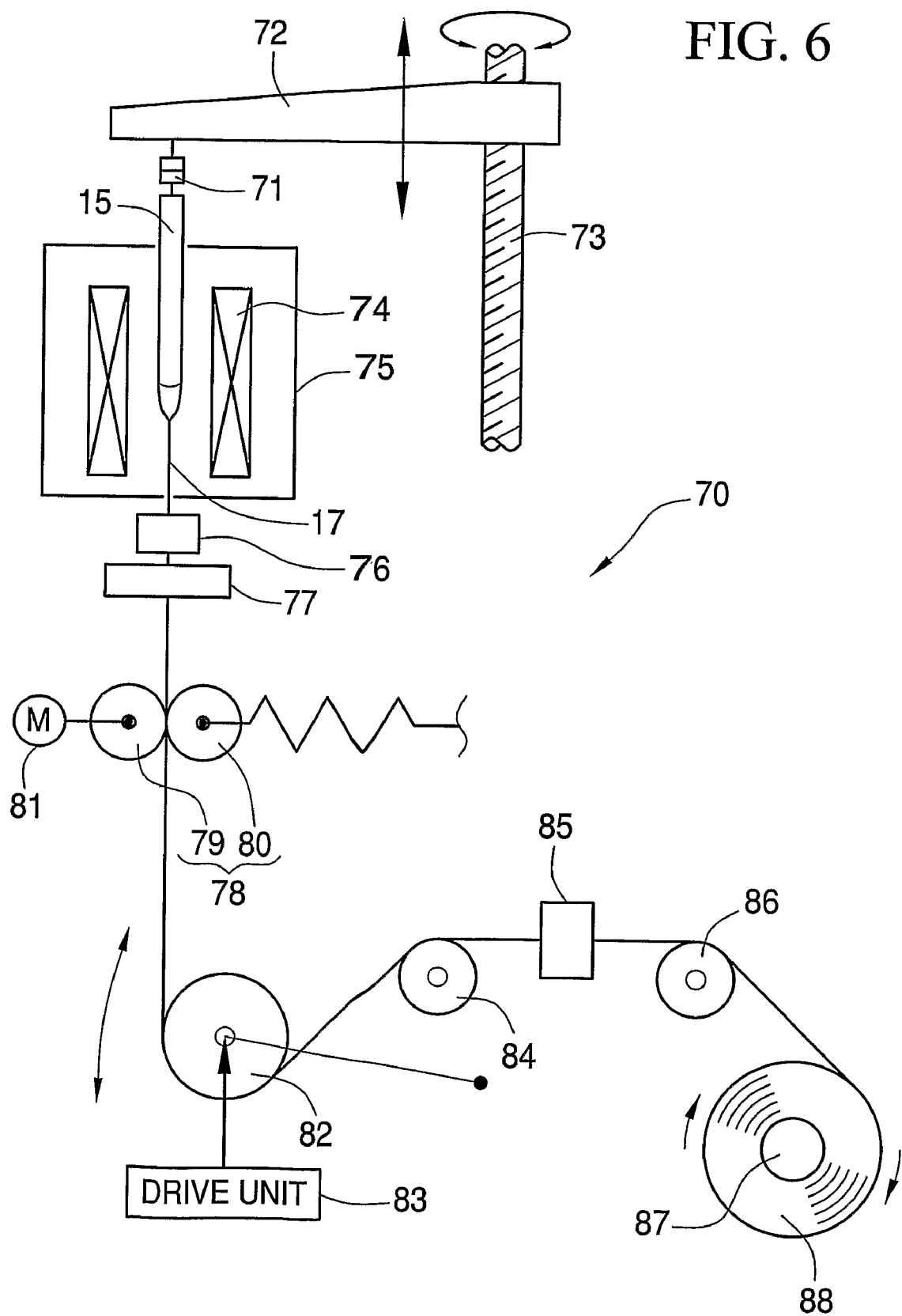
FIG. 6 is a schematic view of a manufacture equipment of the plastic optical fiber.

In FIG. 6, manufacture equipment 70 for manufacturing the POF 17 is illustrated. The preform 15 is supported by a vertical movement arm 72 (hereinafter referred to as "arm") 72 through an X-Y alignment device 71. The arm 72 is vertically movable by the rotation of a vertical movement screw 73 (hereinafter referred to as "screw"). When the screw 73 is rotated to move the arm 72 downward slowly (for example, 1 mm/min to 20 mm/min), the lower end of the preform 15 is inserted in a hollow cylindrical heating furnace 74 that is provided in a heater device 75. A gas supply device (not illustrated) is preferably provided to supply inert gas to set the heater device 75 in an inert gas atmosphere. Examples of the inert gas are nitrogen gas, helium gas, neon gas and argon gas. In terms of the manufacture cost, nitrogen gas is preferable. Helium gas is preferable in terms of thermal conductivity. A mixture gas, such as a mixture gas of helium and argon, is preferable in obtaining the desirable thermal conductivity and reducing the manufacture cost.

The temperature in the heating furnace 74 is preferably 180° C. to 280° C. The preform 15 in the heating furnace 74 is melted little by little from the lower end thereof, and then drawing the molten preform can manufacture the POF 17. A drawing tension measure device 76 measures the drawing tension to the POF 17. A diameter measure device 77 measures the diameter of the POF 17. The POF 17 is drawn by a drawing roller pair 78 at a desirable drawing speed (2 m/min to 50 m/min, for example). The drawing roller pair 78 comprises a drive roller 79 and a pressure roller 80 between which the POF 17 is drawn downward. The drive roller 79 is connected to a motor 81 that can control the rotation speed of the drive roller 79. By controlling the rotation speed 79, the drawing speed of the POF 17 can be adjusted. The sliding speed of the arm 72, the heating temperature of the hearing furnace 74, drawing speed by the drawing roller pair 78 and so forth, are controlled such that the POF 17 has a predetermined diameter.

The drawing tension of the preform 15 is adjusted by the drawing roller pair 78. When the outer diameter D1 of the preform 15 is 10 mm to 100 mm, and when the diameter of the POF 17 is 200 μm to 1000 μm, the drawing tension is preferably 1.5 MPa to 7.0 MPa, more preferably 2 MPa to 6 MPa, and most preferably 2 MPa to 5 Mpa. The diameter of the POF 17 can be determined in accordance with the optical property and the mechanical property in use, but the diameter of the POF 17 is preferably 200 μm to 1000 μm. It is also possible to adjust the drawing tension by controlling the temperature in the heating furnace 74.

In order to measure shrinkage in longitudinal direction, the POF 17 within ten minutes after the drawing process is cut off by 1.0 m. Then, the cut POF 17 is weighed with a spindle, attached to one end of the POF 17, having the weight (5.0 g in this embodiment) not to break and deform the POF 17. And the POF 17 is hanged such that the longitudinal direction of the POF 17 is kept vertically. After keeping the POF 17 at the temperature of 25° C. and the humidity of 50 RH % for three days, the length after shrinkage is measured. Then, the shrinkage in longitudinal direction (percentage) is calculated by dividing the shrunk length by the original length.

The POF 17 is fed downward by a dancer roller 82 for adjusting the tension to the POF 17. The dancer roller 82 is connected to a drive unit 83 for changing the position of the dancer roller 82 to adjust the tension to the POF 17. Thereafter, the POF 17 is fed by a roller 84 to a winding tension measure device 85 for measuring the tension (winding tension) to the POF 17. The POF 17 through the winding tension measure device 85 is fed by a roller 86 to a bobbin 87. When the bobbin 87 is rotated by a rotation drive unit (not illustrated), the POF 17 is wound around the bobbin 87. The POF rolled around the bobbin 87 is referred to as POF roll 88.

Based on the measured value of the winding tension by the winding tension measure device 85, the winding tension is appropriately adjusted by changing the position of the dancer roller 82, the rotation speed of the bobbin 87, and so forth. When the outer diameter D1 of the preform 15 and the diameter of the POF 17 are within the above described range, the winding tension is preferably 0.5 MPa to 5.0 MPa, more preferably 0.7 MPa to 3.5 MPa.

Figure 7:
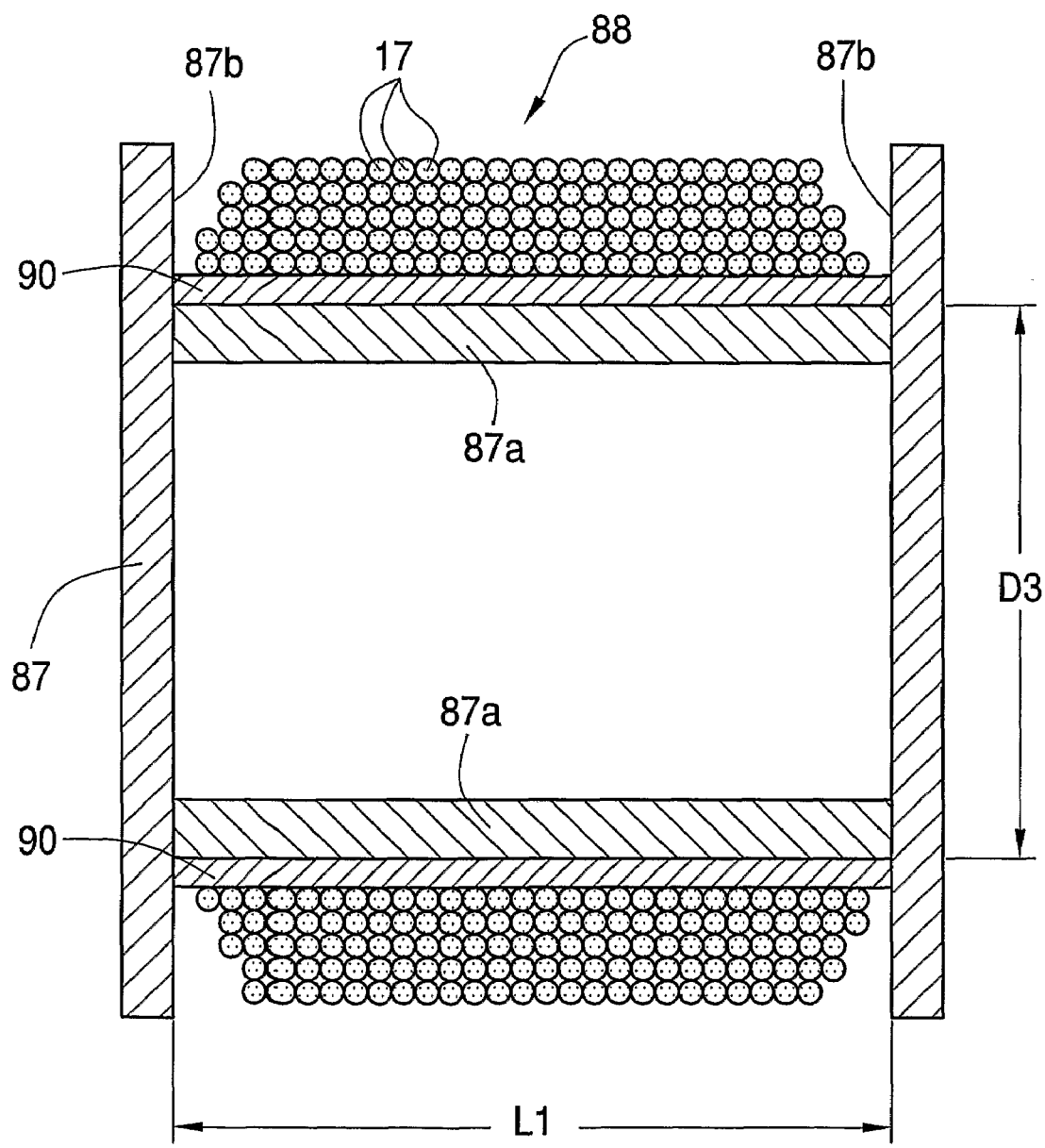
FIG. 7 is a sectional view of essential part of the equipment of FIG. 6.

In FIG. 7, the bobbin 87 to wind the POF 17 is illustrated. The diameter D3 of a bobbin body 87a is preferably 250 mm to 600 mm. The circularity of the diameter D3 calculated by least square method is preferably 5 mm or smaller. When the diameter D3 is less than 200 mm, the winding tension to the POF 17 becomes large, so the transmittance of the POF 17 becomes worse because of microscopic bending in the POF 17. The bobbin 87 with the diameter D3 of more than 600 mm is not practical for storage because of its size. It is preferable to put a soft cushion member 90 around the bobbin body 87a. In order to provide mechanical strength, the bobbin body 87a is made of a hard material such as a metal or a hard plastic. If the POF 17 is directly comes in contact with the hard bobbin body 87a, the POF 17 is deformed to cause microscopic bending, so the cushion member 90 can relax the stress to the POF 17 in winding the POF 17 around the bobbin 87. The hardness of the cushion member 90 measure by a type E durometer (JIS K6253) is preferably 10 to 70. Examples of the materials to satisfy such condition are soft resin form, soft elastomer and silicon gel. The thickness of the cushion member 90 is preferably 2 mm to 8 mm.

The POF 17 is wound around the bobbin body 87a by the assist of a guide (not illustrated) such that the POF 17 does not contact the side wall of a brim 87b of the bobbin 87. To prevent the layered POF 17 around the bobbin 87 from collapsing, it is preferable to wind the POF 17 such that the cross section of the layered POF 17 has the trapezoidal shape. In order to prevent the layered POF 17 from collapsing, the POF 17 is preferable wound such that the center line of the layered POF 17 is vertically extended. The width L1 of the bobbin 87 is preferably 150 mm to 250 mm. The POF 17 around the bobbin 87 preferably has 4 to 5 layers. More than 5 layers of POF 17 will cause fluctuation in the winding position.

As described so far, it is possible to control shrinkage of the POF 17 in storage in the lengthwise direction by adjusting the drawing tension and the winding tension, and by winding the POF 17 to form the POF roll 88 of FIG. 7. Thereby, it is possible to control microscopic bending and deterioration of transmittance loss of the POF 17. The winding process is carried out after the drawing process in the above embodiment. If there are several changes in the tension to the POF 17 because of in-line coating and examination processes, or because of the structure of the manufacture line, the highest tension is adjusted so as not to exceed the upper limit of the adjustment tension before the winding tension adjustment. This is because the orientation of the polymer and the remaining stress caused by the tension cannot be relaxed by the tension adjustment process.

The POF manufactured the above processes can be utilized for various purposes as it is. For the purpose of protection and reinforcement, an optical fiber strand may be produced by coating the POF with a coating layer formed of a resin or a fiber. Plural POF and/or the optical fiber strands may be bunched for various purposes. For instance, molten resin for the coating layer is filled in a pair of dies, faced to each other, having a hole for inserting the POF. Then, by inserting the POF into the hole formed by the pair of dies, it is possible to produce the optical fiber strand coated with the resin. It is preferable that the coating layer is not bonded to the POF in order to control the stress to the bended POF. Since the POF is thermally damaged by the molten resin, it is desirable to adjust the moving speed of the POF and select the resin with low melting temperature for the purpose of decreasing the damage to the POF. The thickness of the coating layer depends on the temperature to melt the material for the coating layer, the feeding speed of the POF and the cooling temperature of the coating layer. Besides the above process, the coating layer can be formed by polymerizing the monomer coated on the POF, winding a sheet around the POF, and inserting the POF into a hollow pipe formed by extrusion.

(Structure of Coating)

Normally, at least one protective layer is coated with the POF, for the purpose of improving flexural and weather resistance, preventing decrease in property by moisture absorption, improving tensile strength, providing resistance to stamping, providing resistance to flame, protecting damage by chemical agents, noise prevention from external light, increasing the value by coloring, and the like.

The plastic optical fiber cable (optical fiber cable) is manufactured by coating the POF and/or the optical fiber strand. As for the type of coating, there are a contact type coating in which the coating layer contacts the whole surface of the POF, and a loose type coating in which a gap is provided between the coating layer and the POF. When the coating layer of the loose type is peeled for attaching a connector, it is possible that the moisture enters the gap between the POF and the coating layer and extends in the longitudinal direction of the optical fiber cable. Thus, the contact type coating is preferable.

The loose type coating, however, has the advantage in relaxing the damages caused by stress and heat to the optical fiber cable due to the gap between the coating layer and the POF. Since the damage to the POF decreases, the loose type coating is preferably applied to some purposes. It is possible to shield moisture from entering from the lateral edge of the optical fiber cable by filling gelled or powdered material in the gap. If the gelled or powdered material as the filler is provided with the function of improving heat-resistance and mechanical strength, the coating layer with excellent properties can be realized. The loose type coating layer can be formed by adjusting the position of the extrusion nipple of the cross head die, and by controlling the pressure in a decompression device. The thickness of the gap layer between the POF and the coating layer can be controlled by adjusting the thickness of the nipple and pressure to the gap layer.

Examples of the materials for the protective layers are thermoplastic resin such as polyethylene (PE), polypropylene (PP), vinyl chloride (PVC), ethylene vinylacetate copolymer (EVA), ethylene ethylacrylate copolymer (EEA), polyester and nylon. Besides the thermoplastic resin, kinds of elastomers can be used. The elastomer with high elasticity is effective in providing mechanical strength, such as bending property. Examples of the elastomer are rubbers such as isoprene rubber, butadiene rubber and diene special rubber, fluid rubber such as polydiene and polyorefine, and thermoplastic elastomers. The fluid rubber exhibits fluidity in the room temperature and loses its fluidity by heat to become solid. The thermoplastic elastomer exhibits elasticity in the room temperature, and be plasticized for shaping at a high temperature. It is possible to use a thermally solidified solution of the mixture of polymer precursor and reactive agent, such as one-pack type thermosetting urethane composition that is composed of urethane pre-polymer with NCO group, described in WO/26374, and solid amine having the size of 20 µm or smaller.

The above listed materials do not limit the present invention as long as the materials can be shaped at a temperature lower than the glass transition temperature Tg of the POF polymer. The copolymer of the above listed materials or other materials can be used. In addition, the mixture polymer can be used. For the purpose of improving the properties of the protective layer, additives and fillers may be added. Examples of the additives are incombustibility, antioxidant, radical trapping agent and lubricant. The fillers may be made from organic and/or inorganic compound.

The POF may have a second (or more) protective layer around the above described protective layer as the first protective layer. If the first protective layer has a thickness enough to decrease the thermal damage to the POF, the requirement of the hardening temperature of the second protective layer becomes less strict compared with the first protective layer. The second protective layer may be provided with the additives such as incombustibility, antioxidant, radical trapping agent and lubricant.

The flame retardants are resin with halogen like bromine, an additive and a material with phosphorus. Metal hydroxide is preferably used as the flame retardant for the purpose of reducing toxic gas emission. The metal hydroxide contains water of crystallization, which is not removed during the manufacture of the POF. Thus, it is preferable to provide a moisture proof coat around the first protective layer and to form the metal hydroxide as the flame retardant around the moisture proof coat. As for the standard of the incombustibility, the UL (Underwriters Laboratory) regulates several experiments. The regulations are CMX (combustion experiment is called as VW-1 experiment), CM (vertical tray combustion experiment), CMR (riser experiment), CMP (plenum experiment), from the lower incombustibility in this order listed. Since the plastic optical fiber is formed from a flammable material, the plastic optical fiber cable preferably has the VW-1 regulation for the purpose of preventing fire spread.

The POF may be coated with plural coating layers with multiple functions. Examples of such coating layers are a flame retardant layer described above, a barrier layer to prevent moisture absorption, moisture absorbent (moisture absorption tape or gel, for instance) between the protective layers or in the protective layer, a flexible material layer and a styrene forming layer as shock absorbers to relax stress in bending the POF, a reinforced layer to increase rigidity. The thermoplastic resin as the coat layer may contain structural materials to increase the strength of the optical fiber cable. The structural materials are a tensile strength fiber with high elasticity and/or a metal wire with high rigidity. Examples of the tensile strength fibers are an aramid fiber, a polyester fiber, a polyamid fiber. Examples of the metal wires are stainless wire, a zinc alloy wire, a copper wire. The structural materials are not limited to those listed above. It is also possible to provide other materials such as a metal pipe for protection, a support wire to hold the optical fiber cable. A mechanism to increase working efficiency in wiring the optical fiber cable is also applicable.

In accordance with the way of use, the POF is selectively used as a cable assembly in which the POFs are circularly arranged, a tape core wire in which the POFs are linearly aligned, a cable assembly in which the tape core wires are bundled by using a band or LAP sheath, or the like.

Compared with the conventional optical fiber cable, the optical fiber cable containing the POF according to the present invention has large permissible error in the core position, the optical fiber cables may be connected directly. But it is preferable to ensure to fix the end of the POF as the optical member according to the present invention by using an optical connector. The optical connectors widely available on the market are PN type, SMA type, SMI type and the like.

A system to transmit optical signals through the POF, the optical fiber wire and the optical fiber cable as the optical member comprises optical signal processing devices including optical components, such as a light emitting element, a light receiving element, an optical switch, an optical isolator, an optical integrated circuit, an optical transmitter and receiver module, and the like. Such system may be combined with other POFs. Any know techniques can be applied to the present invention. The techniques are described in, for example, "'Basic and Practice of Plastic Optical Fiber' (issued from NTS Inc.)", "'Optical members can be Loaded on Printed Wiring Assembly, at Last' in Nikkei Electronics, vol. Dec. 3, 2001", pp. 110-127", and so on. By combining the optical member according to with the techniques in these publications, the optical member is applicable to short-distance optical transmission system that is suitable for high-speed and large capacity data communication and for control under no influence of electromagnetic wave. Concretely, the optical member is applicable to wiring in apparatuses (such as computers and several digital apparatuses), wiring in trains and vessels, optical linking between an optical terminal and a digital device and between digital devices, indoor optical LAN in houses, collective housings, factories, offices, hospitals, schools, and outdoor optical LAN.

Further, other techniques to be combined with the optical transmission system are disclosed, for example, in "'High-Uniformity Star Coupler Using Diffused Light Transmission' in IEICE TRANS. ELECTRON., VOL. E84-C, No. 3, MARCH 2001, pp. 339-344", "'Interconnection in Technique of Optical Sheet Bath' in Journal of Japan Institute of Electronics Packaging., Vol. 3, No. 6, 2000, pp. 476-480". Moreover, there are am optical bus (disclosed in Japanese Patent Laid-Open Publications No. 10-123350, No. 2002-90571, No. 2001-290055 and the like); an optical branching/coupling device (disclosed in Japanese Patent Laid-Open Publications Nos. 2001-74971, 2000-329962, 2001-74966, 2001-74968, 2001-318263, 2001-311840 and the like); an optical star coupler (disclosed in Japanese Patent Laid-Open Publications No. 2000-241655); an optical signal transmission device and an optical data bus system (disclosed in Japanese Patent Laid-Open Publications Nos. 2002-62457, 2002-101044, 2001-305395 and the like); a processing device of optical signal (disclosed in Japanese Patent Laid-Open Publications No. 2000-23011 and the like); a cross connect system for optical signals (disclosed in Japanese Patent Laid-Open Publications No. 2001-86537 and the like); a light transmitting system (disclosed in Japanese Patent Laid-Open Publications No. 2002-26815 and the like); multi-function system (disclosed in Japanese Patent Laid-Open Publications No. 2001-339554, No. 2001-339555 and the like); and various kinds of optical waveguides, optical branching, optical couplers, optical multiplexers, optical demultiplexers and the like. When the optical system having the optical member according to the present invention is combined with these techniques, it is possible to construct an advanced optical transmission system to send/receive multiplexed optical signals. The optical member according to the present invention is also applicable to other purposes, such as for lighting, energy transmission, illumination, and sensors.

[Experiments]

The present invention will be described in detail with reference to Experiments (1)-(4) as the embodiments of the present invention and Experiments (5)-(6) as the comparisons. The materials, contents, operations and the like will be changed so far as the changes are within the spirit of the present invention. Thus, the scope of the present invention is not limited to the Experiments described below. The description below explains Experiment (1) in detail. Regarding Experiments (2)-(6), the portions different from Experiment (1) will be explained.

The clad pipe 12, formed from polyvinylidene fluoride by extrusion, has the outer diameter D1 of 20 mm, the inner diameter of 19 mm (clad thickness t1 is 0.5 mm), and the length of 900 mm. The clad pipe 12 is inserted in the rigid polymerization chamber having the inner diameter of 20 mm and the length of 1000 mm. After the polymerization chamber containing the clad pipe 12 is washed with pure water, the polymerization chamber is dried under the temperature of 90° C. Thereafter, one end of the clad pipe 12 is sealed by a Teflon® stopper. The inner wall of the clad pipe 12 is washed with ethanol, and then the clad pipe 12 is subject to decompression process (−0.08 MPa to atmospheric pressure) for 12 hours at 80° C. by an oven.

Next, the outer core polymerization process 13 is carried out. The outer core solution is prepared in an Erlenmeyer flask. The outer core solution contains deuteriated methylmethacrylate (MMA-d8, produced by Wako Pure Chemical Industries, Ltd.) of 205.0 g, 2-2'-azobis(isobutyric acid) dimethyl of 0.0512 g, and 1-dodecanethiol(laurylmercaptan) of 0.766 g. The outer core solution is subject to ultrasonic irradiation for ten minutes by use of an ultrasonic cleaner USK-3 (38000 MHz, output power of 360 W), manufactured by AS ONE Corporation. Then, after pouring the outer core solution in the clad pipe 12, the clad pipe 12 is subject to decompression of 0.01 MPa to atmospheric pressure by use of a decompression filter machine, and subject to the ultrasonic process for 5 minutes by use of the ultrasonic cleaner.

After substituting the air in the tip of the clad pipe 12 with argon gas, the tip of the clad pipe is tightly sealed with a silicon stopper and a sealing tape. The clad pipe 12 containing the outer core solution is subject to preliminary polymerization for two hours while shaking the clad pipe 12 in a hot water bath at 60° C. After the preliminary polymerization, the clad pipe 12 is held horizontally (the longitudinal direction of the clad pipe is kept horizontally) and is subject to heat polymerization (rotational polymerization) while rotating the clad pipe 12 at 500 rpm and keeping the temperature at 60° C. Thereafter, the clad pipe 12 is subject to rotational polymerization for 16 hours at 3000 rpm and 60° C., and then for 4 hours at 3000 rpm and 90° C. Thereby, the cylindrical pipe having the outer core 20a of PMMA-d8 inside the clad pipe 12.

The preliminary process for forming the inner core is carried out. The clad pipe 12 having the outer core 20a is subject to decompression process (−0.08 MPa to atmospheric pressure) at 90° C. by an oven. Then, the inner core polymerization process 14 is carried out. The inner core solution, containing deuteriated methylmethacrylate (MMA-d8, produced by Wako Pure Chemical Industries, Ltd.) of 82.0 g, 2-2'-azobis(isobutyric acid) dimethyl of 0.070 g, 1-dodecanethiol (laurylmercaptan) of 0.306 g, and diphenyl sulfide (DPS) as the dopant of 6.00 g, is prepared in an Erlenmeyer flask. Then, the clad pipe 12 is subject to ultrasonic process irradiation for 10 minutes by use of the ultrasonic cleaner USK-3.

After keeping the clad pipe 12 with the outer core 20a for 20 minutes at 80° C., the inner core solution is poured in the hollow part of the clad pipe 12. One end of the clad pipe 12 is coated with the sealing tape. The clad pipe 12 is kept vertically (the portion sealed with the sealing tape is in upside) in an autoclave, and the autoclave is closed. In an atmosphere of argon gas at 0.05 MPa and at 100° C., the clad pipe 12 is subject to interfacial gel polymerization for 48 hours, and then heat polymerization and heat process for 24 hours at 120° C. Thereby, the preform 15 having the inner core 20b is produced.

The preform 15 is subject to the drawing process 16 in the manufacture equipment. The temperature of the heating furnace 74 is 240° C. The bobbin 87 has the diameter D3 of 500 mm, circularity of 3 mm (calculated by least square method), and the width L1 of 200 mm. The bobbin body 87a is wound around the cushion member 90 (Toraypef, the expansion ratio: 30, manufactured by Toray Industries, Inc.). The hardness of the cushion member 90, measured by the type E Durometer, is 25, and the thickness of the cushion member 90 is 4 mm. The heat drawing process is carried out to form the POF 17 having the outer diameter of 316 μm. The POF of 250 m is wound around the bobbin 87 at the drawing speed of 9 m/min, the drawing tension of 3.7 MPa, and the winding tension of 2.5 MPa. The POF is wound so as not to contact the brim 87b of the bobbin 87, as shown in FIG. 7. When the outer diameter of the POF 17 during the melt drawing process is measured by use of a diameter measure device 77, the fluctuation in the outer diameter of the POF is ±3 μm. The measured transmission loss of the POF 17 at the wavelength of 650 nm is as good as 90 dB/km.

The shrinkage in longitudinal direction of the POF 17 is 0.05%. The shrinkage in longitudinal direction (percentage) is measured by cutting off the POF by 1.0 m within 10 minutes after the drawing process, by hanging the cut POF with the spindle of 5 g for 3 days at 25° C. and 50 RH %, and by dividing the shrunk length by the original length. The POF roll 88 is kept for 3 days under the condition of the temperature of 25° C. and the humidity of 25 RH %. Thereafter, the measured transmission loss of the POF 17 at the wavelength of 650 mm is 92 dB/km.

In Experiment 2, the temperature of the heating furnace 74 is 250° C., and the heat drawing process is carried out such that the outer diameter of the POF 17 becomes 750 μm. The POF 17 of 200 m is wound around the bobbin 87 at the drawing speed of 3 m/min, the drawing tension of 1.6 MPa, and the winding tension of 0.9 MPa. Besides the above changes, other conditions are the same as those in Experiment 1. Fluctuation in the outer diameter of the POF 17 is ±5 μm. The measured transmission loss of the POF 17 at the wavelength of 650 nm is 95 dB/km. The shrinkage in longitudinal direction of the POF 17 is 0.05%. After storing the manufactured POF 17, the transmission loss is measured. The transmission loss at the wavelength of 650 nm is 97 dB/km, which is substantially the same as that before storage.

In Experiment 3, the temperature of the heating furnace 74 is 230° C. The POF 17 of 300 m is wound around the bobbin 87 at the drawing tension of 4.2 MPa, and the winding tension of 1.2 MPa. Besides the above changes, other conditions are the same as those in Experiment 1. Fluctuation in the outer diameter of the POF 17 is ±3 μm. The measured transmission loss of the POF 17 at the wavelength of 650 nm is 92 dB/km. The shrinkage in longitudinal direction of the POF 17 is 0.07%. After storing the manufactured POF 17, the transmission loss is measured. The transmission loss at the wavelength of 650 nm is 94 dB/km, which is substantially the same as that before storage.

In Experiment 4, the temperature of the heating furnace 74 is 260° C. The POF 17 of 250 m is wound around the bobbin 87 at the drawing tension of 1.0 MPa, and the winding tension of 2.2 MPa. Besides the above changes, other conditions are the same as those in Experiment 1. Fluctuation in the outer diameter of the POF 17 is ±4 μm. The measured transmission loss of the POF 17 at the wavelength of 650 nm is 88 dB/km. The shrinkage in longitudinal direction of the POF 17 is 0.03%. After storing the manufactured POF 17, the transmission loss is measured. The transmission loss at the wavelength of 650 nm is 89 dB/km, which is substantially the same as that before storage.

In Experiment 5 as the comparison, the POF 17 of 250 m is wound around the bobbin 87 at the winding tension of 5.5 MPa. Besides the above changes, other conditions are the same as those in Experiment 1. Fluctuation in the outer diameter of the POF 17 is ±3 μm. The measured transmission loss of the POF 17 at the wavelength of 650 nm is 93 dB/km. The shrinkage in longitudinal direction of the POF 17 is 0.19%. After storing the manufactured POF 17, the transmission loss is measured. The transmission loss at the wavelength of 650 nm is 115 dB/km, which is worse than that before storage.

In Experiment 6 as the comparison, the temperature of the heating furnace 74 is 220° C. The POF 17 of 250 m is wound around the bobbin 87 at the drawing tension of 8.7 MPa, and the winding tension of 3.7 MPa. Besides the above changes, other conditions are the same as those in Experiment 1. Fluctuation in the outer diameter of the POF 17 is as large as ±7 μm. The measured transmission loss of the POF 17 at the wavelength of 650 nm is 105 dB/km. The shrinkage in longitudinal direction of the POF 17 is 0.26%. After storing the manufactured POF 17, the transmission loss is measured. The transmission loss at the wavelength of 650 nm is 135 dB/km, which is worse than that before storage.

INDUSTRIAL APPLICABILITY

The present invention is applicable to an optical member such as a plastic optical fiber, an optical connector, lenses, optical films, and so forth. Besides the drawing process, the present invention is also applicable to a coating process or a heating process to remove a volatile substance contained in the plastic optical fiber.

The invention claimed is:

1. A method for manufacturing a plastic optical fiber, the method comprising the steps of:
   (a) applying winding tension to the heated plastic optical fiber;
   (b) winding the plastic optical fiber such that the plastic optical fiber just after the winding process has the shrinkage of 0.10% or smaller; and
   (c) adjusting the winding tension by an adjustment tension that is different from the winding tension,
   wherein the adjustment tension is 1.5 MPa to 7.0 MPa.

2. The method according to claim 1, wherein the diameter of the plastic optical fiber is 1000μm or smaller.

3. The method according to claim 1, wherein the winding tension is 0.5 MPa to 5.0 MPa.

4. The method according to claim 1, wherein the heated plastic optical fiber is produced by melt-drawing a plastic optical fiber base material.

5. The method according to claim 1, wherein the plastic optical fiber is wound around a winding member that comprises a bobbin body and a soft material wound around the bobbin body;
   wherein the hardness of the soft material measured by type E Durometer is 10 to 70.

6. The method according to claim 1, wherein the clad part of the plastic optical fiber is formed from fluorine resin.

7. The method according to claim 1, wherein the core part of the plastic optical fiber is formed from acrylic resin.

8. The method according to claim 1, wherein the core part of the plastic optical fiber has a refractive index profile in which the refractive index decreases from the center to the surface.

9. A method for manufacturing a plastic optical fiber, the method comprising the steps of:
 (a) melting and drawing a plastic optical fiber base material to form a plastic optical fiber;
 (b) applying winding tension to the plastic optical fiber;
 (c) winding the plastic optical fiber such that the plastic optical fiber just after the winding process has the shrinkage of 0.10% or smaller; and
 (d) adjusting the winding tension by an adjustment tension that is different from the winding tension,
wherein the adjustment tension is 1.5 MPa to 7.0 MPa.

* * * * *